United States Patent [19]
Hugonnier

[11] 3,887,156
[45] June 3, 1975

[54] EXTERIOR DRIVING MIRROR FOR AN AUTOMOBILE VEHICLE

[76] Inventor: Charles Hugonnier, 93, Rue de Prony, 75 Paris, France

[22] Filed: Jan. 25, 1974

[21] Appl. No.: 436,811

[52] U.S. Cl. .............................. 248/475 A; 403/227
[51] Int. Cl. .............................................. B60r 1/04
[58] Field of Search .......... 403/225, 226, 227, 326; 248/204, 475 B, 475 A

[56] References Cited
UNITED STATES PATENTS

| | | | |
|---|---|---|---|
| 2,999,707 | 9/1961 | Kniepkamp | 403/225 |
| 3,544,259 | 12/1970 | Fujita | 248/475 A |
| 3,703,270 | 11/1972 | Tomlin | 248/475 A |

FOREIGN PATENTS OR APPLICATIONS

| | | | |
|---|---|---|---|
| 25,898 | 5/1956 | Germany | 248/475 A |
| 1,246,937 | 10/1960 | France | 248/475 A |

Primary Examiner—William H. Schultz

[57] ABSTRACT

The end of the arm remote from the mirror is mounted in the bore of a socket on a base in such manner as to be released from the base upon application of a blow of predetermined magnitude. The base is adapted to be secured to a vehicle. The end of the arm carries a screw which holds an expanding collar on the arm. The collar has an outer surface which is convergent toward the arm and is inserted in an elastomeric retaining ring interposed between the collar and the bore of the socket. The screw, in axially clamping the collar against the arm, radially compresses the ring between the convergent surface of the collar and the bore and thereby secures the arm to the base while allowing the arm to become automatically released from the base when said blow is applied to the arm.

12 Claims, 4 Drawing Figures

EXTERIOR DRIVING MIRROR FOR AN AUTOMOBILE VEHICLE

The present invention relates to exterior driving mirrors for automobile vehicles.

Such a driving mirror, which performs a safety function in that it affords the driver a good lateral rear view, must also satisfy an additional safety condition, that is to say, it must not constitute, owing to its projection from the body of a vehicle, a danger to pedestrians who might be hit by the driving mirror or ejected passengers who might be thrown against the mirror. This is why official regulations require that the part of an exterior driving mirror which carries the reflecting part of the mirror become separated from the body of the vehicle under the effect of a moderate shock.

In order to satisfy the aforementioned requirements, an object of the invention is to provide an exterior driving mirror comprising a base for securing to the vehicle body and an arm one end of which carries a mirror whereas the other end is detachably secured to the base, the base having for this purpose a boss in the form of a socket in which there is held fast by an element fixed in or on the corresponding end of the arm, a retaining member which is capable of withdrawing under the effect of a blow applied to the arm, so that, upon impact, the arm becomes separated from the base.

In the driving mirror according to the invention, the retaining member is constituted by a ring of deformable material which is radially compressed against the bore of the socket under a clamping effect exerted by an outer surface, convergent toward the arm, of an expanding collar which is coaxial with the bore and is subjected to the action of the element fixed to the arm and is engaged inside the deformable ring.

In the event of impact on the arm, the latter is subjected to a wrenching torque transmitted to the expanding collar which thereupon passes through, by rolling, the deformable ring which is for example an O-ring, and escapes from the socket so that the arm is released upon impact and becomes harmless in the event that a pedestrian, or passenger ejected from a vehicle, strikes against the driving mirror.

As compared to conventional exterior driving mirrors in which the retaining member is rigid, the arrangement according to the invention affords the advantage of an assembly in which there is interposed between the arm and the support, a flexible member whereby the arm is prevented from undergoing a vibration which is liable to disturb the image given by the mirror.

Further features and advantages of the invention will be apparent from the ensuing description with reference to the accompanying drawing.

Figure 1:
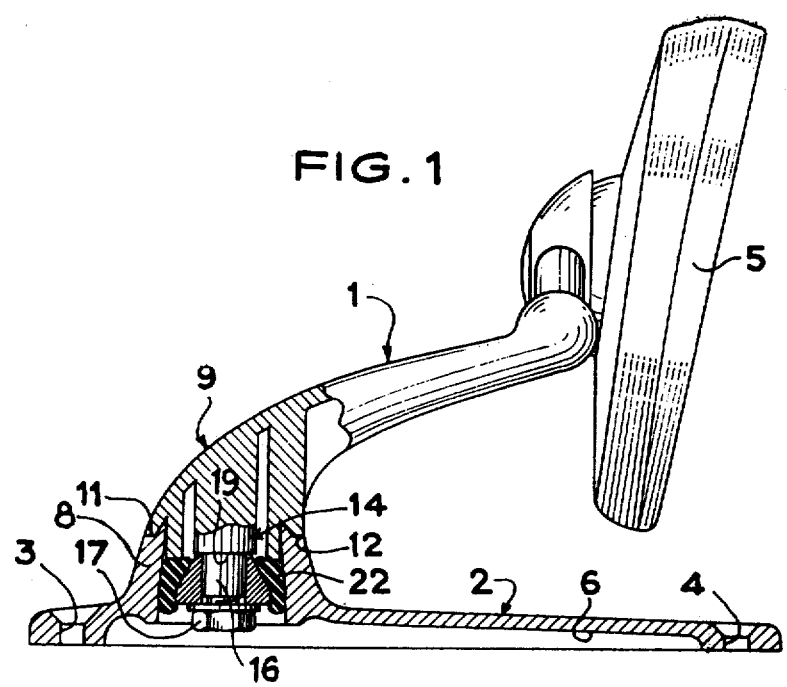
FIG. 1 is an elevational view, partly in section, of an exterior driving mirror in the assembled position.
Figure 2:
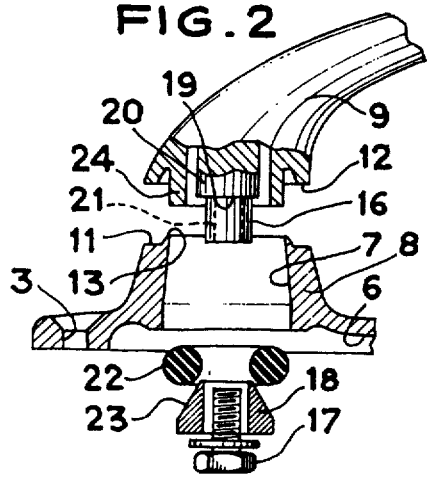
FIG. 2 is a partial view, corresponding to FIG. 1, showing the separated state of the two parts of the arm by which the arm is normally secured to the base.

The exterior driving mirror shown in FIG. 1 comprises an arm 1 having a free end carrying a mirror 5, mounted by means of a swivel joint, the arm being separably assembled with a base 2 adapted to be secured to the body of an automobile vehicle. The base 2 is in the form of an elongate plate the end portions 3 and 4 of which are provided with apertures for the passage of fixing screws. The underside of the base defines a longitudinal cavity 6. A bore 7 is formed in the region of the base 2 adjacent the end 3 defining an annular boss 8 acting as a socket.

The corresponding end of the arm 1 constitutes a mount 9 which is fitted on the boss 8. An annular seat 11, provided in an end portion of the boss 8, and a corresponding bearing surface 12 provided on the mount 9, are applied together and center the mount 9 on the boss 8 owing to the effect of a centre annular projection 13 adjacent the seat 11. Formed in the centre of the mount 9 is a stepped stem 14 which is engaged, in the assembled state of the arm, in the bore 7 of the socket 8, the small-diameter end portion 16 of the stem having a blind tapped hole 21 in which is engaged a fixing screw 17 which axially clamps an expanding collar 18 against a shoulder 19 formed between the end portion 16 and the large-diameter portion 20 of the stem 14 and thereby ensures the radial compression of an O-ring 22 of elastomer against the bore 7 by the action of the frustoconical outer surface 23 of the collar 18 introduced in the ring 22. The collar 18 is centered on the smooth outer surface of the cylindrical end portion 16.

The ring 22 is simultaneously in axial abutment with the end face or rigid abutment of an annular skirt portion 24 formed in the mount 9 between the bearing surface 12 and the stem 14, so that it undergoes a deformation which is both axial and radial, as shown in FIG. 1.

Figure 3:
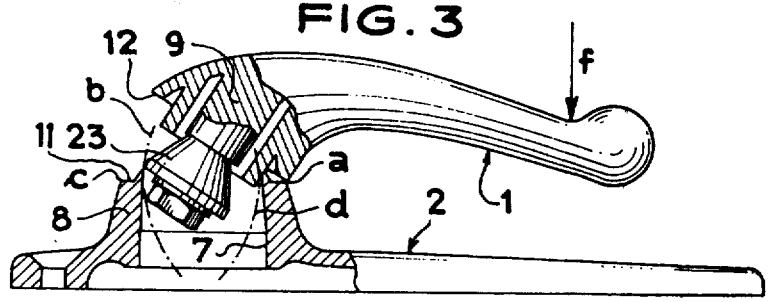
FIG. 3 is an elevational view, partly in section, showing how the arm is separated from the base in the event of impact.

The radial compression against the bore 7, which preferably has a slight taper toward the mount 9, which is in the same direction as the taper of the surface 23, ensures that the mount 9 is held fast with the boss 8. However, this fixing structure is capable of yielding when the arm 1 receives a blow exceeding a predetermined value for example in the direction of arrow $f$ of FIG. 3 (in which the ring 22 has been omitted for clarity). In this case, the arm 1 undergoes a wrenching torque which tends to turn the mount 9 about the centre $a$ defined by the outer edge of the bearing surface 11. The outer edge of the expanding collar 18 then describes a circle $b$ having a centre $a$ which of course remains inside the bore 7 of the socket 8. In the event that the impact on the driving mirror occurs in the direction opposed to the arrow $f$, the outer edge of the collar 18 would of course describe a circle $d$ whose centre $c$ would also be on the outer edge of the bearing surface 11. The arm is released by the rolling and crushing of the ring 22 under the effect of the torque applied to the arm 1.

Figure 4:
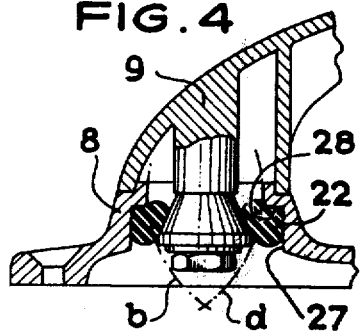
FIG. 4 is a partial sectional view, corresponding to FIG. 1, of a modification of the structure by which the arm is assembled with the base.

In the modification shown in FIG. 4, the bore of the boss 8 has a cylindrical portion 27 axially adjacent a shoulder 28 or rigid abutment against which the O-ring 22 bears axially. The mount 9 is simplified by the elimination of the intermediate skirt portion 24.

Having now described my invention what I claim as new and desire to secure by Letters Patent is:

1. An exterior driving mirror for an automobile vehicle comprising a base for securing to a vehicle body, an arm having a first end portion and a second end portion, a mirror mounted on said first end portion of the arm, the base having a socket defining a bore having a longitudinal axis, means for securing said second end portion of the arm to said socket in such manner that a blow on the arm of a predetermined magnitude causes release of the arm from the base, said means comprising a first abutment surface on the arm, a second abutment surface on the base, the first abutment and second abutment surfaces being in abutting relation axially of the bore when the arm is assembled with the base, a retaining ring of deformable material having an inner surface and an outer surface which is engaged in and in contact with the bore, a ring-expanding collar having an outer surface which is convergent toward said second end portion of the arm and coaxial with the bore and engaged in the ring in contact with said inner surface, means defining a rigid axial abutment for the ring in the bore adjacent said second end portion of the arm, an element securing the collar to said second end portion of the arm and exerting on the collar a force axially of the bore toward said second end portion of the arm and urging the convergent outer surface of the collar axially of the bore and the ring and thereby clamping the ring against the bore and radially compressing the ring and axially compressing the ring against said axial abutment, the ring being capable of elastically deforming and withdrawing from between the collar and the bore upon application of said blow.

2. A driving mirror as claimed in claim 1, wherein the ring is of an elastomeric material.

3. A driving mirror as claimed in claim 1, comprising a shoulder on said second end portion of the arm, the collar being in abutting relation to the shoulder.

4. A driving mirror as claimed in claim 1, wherein the bore of the socket is convergent toward said second end portion of the arm.

5. A driving mirror as claimed in claim 4, wherein the bore is frustoconical.

6. A driving mirror as claimed in claim 4, wherein the bore has a shoulder acting as said axial abutment for the deformable ring.

7. A driving mirror as claimed in claim 1, wherein said second end portion of the arm has an annular projection constituting an annular axial abutment constituting said axial abutment for the ring.

8. A driving mirror as claimed in claim 1, wherein said second end portion of the arm has a stem which is disposed in the bore and has a tapped hole, said element being a screw screwthreadedly engaged in the tapped hole.

9. A driving mirror as claimed in claim 8, wherein the stem has a smooth end portion and the expanding collar is mounted on and centered by the smooth end portion.

10. A driving mirror as claimed in claim 1, wherein the deformable ring is an O-section ring in the free undeformed state of the ring.

11. A driving mirror as claimed in claim 1, wherein the outer surface of the expanding collar is frustoconical.

12. An exterior driving mirror for an automobile vehicle comprising a base for securing to a vehicle body, an arm having a first end portion and a second end portion, a mirror mounted on said first end portion of the arm, the base having a socket defining a bore having a longitudinal axis, means for securing said second end portion of the arm to said socket in such manner that a blow on the arm of a predetermined magnitude causes release of the arm from the base, said means comprising a first abutment surface on the arm, a second abutment surface on the base, the first abutment and second abutment surfaces being in abutting relation axially of the bore when the arm is assembled with the base, a retaining ring of elastomeric material having an inner surface and an outer surface which is engaged in and in contact with the bore, a ring-expanding collar having an outer surface which is convergent toward said second end portion of the arm and coaxial with the bore and engaged in the ring in contact with said inner surface, a rigid axial abutment on one of two members consisting of the arm and base in the bore adjacent said second end portion of the arm, an element securing the collar to said second end portion of the arm and exerting on the collar a force axially of the bore toward said second end portion of the arm and urging the convergent outer surface of the collar axially of the bore and the ring and thereby clamping the ring against the bore and radially compressing the ring and axially compressing the ring against said axial abutment, the ring being capable of elastically deforming and withdrawing from between the collar and the bore upon application of said blow on the arm, said element being rotatable relative to and in screwthreaded engagement with said second end portion of the arm and said axial force being adjustable by rotation of said element relative to the arm.

* * * * *